United States Patent
Sokolov

(10) Patent No.: US 9,984,705 B2
(45) Date of Patent: May 29, 2018

(54) NON-INTRUSIVE QUALITY MEASUREMENTS FOR USE IN ENHANCING AUDIO QUALITY

(71) Applicant: DSP Group, San Jose, CA (US)

(72) Inventor: Dotan Sokolov, Ra'anana (IL)

(73) Assignee: DSP GROUP LTD., Herzliya (IL)

( * ) Notice: Subject to any disclaimer, the term of this patent is extended or adjusted under 35 U.S.C. 154(b) by 234 days.

(21) Appl. No.: 14/107,772

(22) Filed: Dec. 16, 2013

(65) Prior Publication Data
US 2015/0030163 A1    Jan. 29, 2015

Related U.S. Application Data

(60) Provisional application No. 61/858,135, filed on Jul. 25, 2013.

(51) Int. Cl.
| | | |
|---|---|---|
| H04R 29/00 | (2006.01) | |
| G10L 25/69 | (2013.01) | |
| H04M 3/22 | (2006.01) | |
| G10L 25/60 | (2013.01) | |
| H04M 3/56 | (2006.01) | |

(52) U.S. Cl.
CPC ............ *G10L 25/69* (2013.01); *G10L 25/60* (2013.01); *H04M 3/2236* (2013.01); *H04M 3/56* (2013.01)

(58) Field of Classification Search
CPC ......... G10L 25/60; G10L 25/69; G10L 15/26; G10L 21/02; H04M 3/2236; H04M 3/56; H04N 7/147
See application file for complete search history.

(56) References Cited

U.S. PATENT DOCUMENTS

| | | | |
|---|---|---|---|
| 6,256,476 B1* | 7/2001 | Beamish | H04W 52/283 340/7.36 |
| 2004/0162722 A1* | 8/2004 | Rex et al. | 704/211 |
| 2007/0129022 A1* | 6/2007 | Boillot | G10L 25/69 455/90.1 |
| 2007/0248012 A1* | 10/2007 | Glinsman | H04L 12/66 370/232 |
| 2008/0080484 A1* | 4/2008 | Hughes et al. | 370/352 |
| 2014/0214426 A1* | 7/2014 | Kanevsky | G10L 15/08 704/257 |
| 2014/0278423 A1* | 9/2014 | Dellisanti et al. | 704/254 |

* cited by examiner

*Primary Examiner* — Andrew L Sniezek
(74) *Attorney, Agent, or Firm* — Reches Patents

(57) ABSTRACT

Methods and systems are provided for receiving by a first electronic device audio content, determining audio quality of the received audio content, which includes measuring and/or estimating quality related parameters associated with the received audio content, and communicating the quality related parameters to a second electronic device, from which the audio content was transmitted. The quality related parameters may be used to control audio related functions in the second electronic device. The audio related functions may comprise noise reduction, noise suppression, cancellation, distortion reduction, equalization, compression, enhancement and/or audio rate conversion. Determining the audio quality of the received audio content may be based on one or more noise related thresholds. The quality related parameters may be communicated to the second electronic device over a dedicated control channel setup between the devices.

35 Claims, 4 Drawing Sheets

NON-INTRUSIVE QUALITY MEASUREMENTS FOR USE IN ENHANCING AUDIO QUALITY

CLAIM OF PRIORITY

This patent application makes reference to, claims priority to and claims benefit from the U.S. Provisional Patent Application No. 61/858,135, filed on Jul. 25, 2013, which is hereby incorporated herein by reference in its entirety.

TECHNICAL FIELD

Aspects of the present application relate to audio processing. More specifically, certain implementations of the present disclosure relate to non-intrusive quality measurements for use in enhancing audio quality. In particular, various implementations of the present disclosure relate to non-intrusive measurements of quality of voice and/or other audio, and using these measurements to improve quality of voice and/or other audio—e.g., in modifying or controlling algorithms used therefor, such as noise and/or distortion related algorithms.

BACKGROUND

Existing methods and systems for providing voice and/or other audio processing, particularly for improving quality thereof (e.g., noise and/or distortion processing), may be inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for non-intrusive quality measurements for use in enhancing audio quality, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

Certain example implementations may be found in method and system for non-intrusive noise cancellation in electronic devices, particularly in user-supported devices. As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "example" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
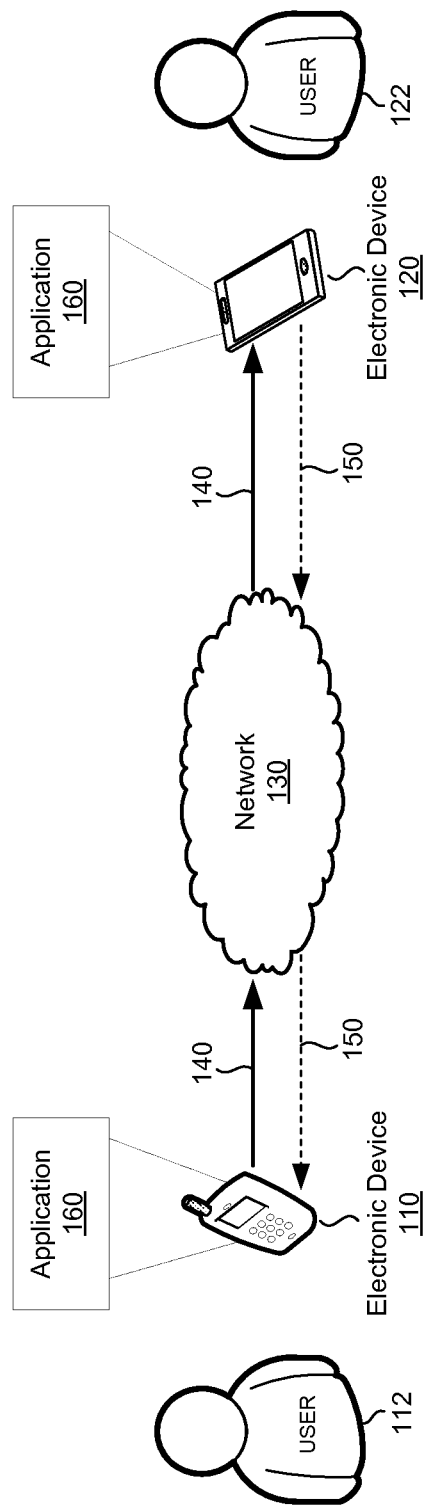
FIG. 1 illustrates an example communication system that may support receiver-based non-intrusive quality measurements, for use in improving quality of voice and/or other audio.

FIG. 1 illustrates an example communication system that may support receiver-based non-intrusive quality measurements, for use in improving quality of voice and/or other audio. Referring to FIG. 1, there is shown a communication system 100 comprising electronic devices 110 and 120, and a network 130.

The communication system 100 may comprise a plurality of devices (of which the electronic devices 110 and 120 are shown), and communication resources (of which the network 130 is shown) to enable the devices to communicate with one another, such as via the network 130. The communication system 100 is not limited to any particular type of communication media, interfaces, or technologies.

Each of the electronic devices 110 and 120 may comprise suitable circuitry for performing or supporting various functions, operations, applications, and/or services. The functions, operations, applications, and/or services performed or supported by the electronic devices may be run or controlled based on user instructions and/or pre-configured instructions.

In some instances, electronic devices (e.g., the electronic devices 110 and 120) may support communication of data, such as via wired and/or wireless connections, in accordance with one or more supported wireless and/or wired protocols or standards.

In some instances, electronic devices (e.g., the electronic devices 110 and 120) may be a mobile and/or handheld device—i.e. intended to be held or otherwise supported by a user during use of the device, thus allowing for use of the device on the move and/or at different locations. In this regard, the electronic device 100 may be designed and/or configured to allow for ease of movement, such as to allow it to be readily moved while being held by the user as the user moves, and the electronic device 100 may be configured to perform at least some of the operations, functions, applications and/or services supported by the device on the move.

In some instances, electronic devices (e.g., the electronic devices 110 and 120) may support input and/or output of audio. For example, each of the electronic devices 110 and 120 may incorporate, for example, a plurality of speakers and microphones, for use in outputting and/or inputting (capturing) audio, along with suitable circuitry for driving, controlling and/or utilizing the speakers and microphones.

Examples of electronic devices may comprise communication mobile devices (e.g., cellular phones, smartphones, and tablets), computers (e.g., servers, desktops, and laptops), dedicated media devices (e.g., televisions, portable media players, cameras, and game consoles), and the like. In some instances, the electronic device 100 may even be a wearable device—i.e., may be worn by the device's user rather than being held in the user's hands. Examples of wearable electronic devices may comprise digital watches and watch-like devices (e.g., iWatch) or glasses (e.g., Google Glass). The disclosure, however, is not limited to any particular type of electronic device.

The network 130 may comprise a system of interconnected nodes and/or resources (hardware and/or software), for facilitating exchange and/or forwarding (including such functions as routing, switching, and the like) of data among a plurality of devices (peers), and thus a plurality of end users, based on one or more networking standards. Physical connectivity within, and/or to or from the network 130, may be provided using, for example, copper wires, fiber-optic cables, wireless links, and the like. The network 130 may correspond to any suitable phone network, satellite network, cellular network, the Internet, local area networks (LAN), wide area network (WAN), or any combination thereof.

In operation, the electronic devices 110 and 120 may be in communication with each other within the communication system 100, such as via the network 130. The communication between the electronic devices 110 and 120 may comprise exchange of data, which may include audio (e.g., voice and/or other audio). For example, the electronic devices 110 and 120 may be communication devices (e.g., landline phone, mobile phone, or the like), which may be used to conduct voice calls between devices users (e.g., users 112 and 122, of electronic devices 110 and 120, respectively). In the communication system 100 of FIG. 1, audio content may be communicated from the electronic device 110 to the electronic device 120 (thus the electronic device 110 being the transmit-side and the electronic device 110 being the receive-side). Nonetheless, a device may be both a transmit-side device and a receive-side device, such as during bidirectional exchange of audio content (e.g., where the electronic devices 110 and 120 are being utilized to conduct a voice call between users 112 and 122).

The exchange of audio content may entail converting the audio content to signals suited for communication, such as over the network 130. For example, the electronic device 110 may incorporate one or more suitable transducers (and related audio processing circuitry), for use in transferring acoustic signals into electric signals (e.g., data). Examples of common transducers used in this manner may comprise a microphone which may be used in receiving (e.g., capturing) acoustic signals, which may be processed to output corresponding analog or digital signals, which may then be communicated through the network 130, such as over connection 140 (e.g., comprising one or more suitable wired and/or wireless connections, into and/or through the network 130), to the electronic device 120. The electronic device 120 may incorporate one or more suitable transducers (and related audio processing circuitry), for use in transferring the received electric signals (e.g., data) into acoustic signals. Examples for common transducers used in this manner may comprise speakers, earpieces, headsets, and the like.

The quality of the voice and/or other audio on the receive-side device (e.g., the electronic device 120) may depend on different factors. For example, the quality of the voice and/or other audio may depend on the resources being used (transducer circuitry, transmitter circuitry, receiver circuitry, network, etc.) and/or environmental conditions. A noisy environment at the transmit-side, for example, may reduce the quality of voice and/or other audio at the receive-side. In this regard, a noisy environment may be causes by such conditions as wind, ambient audio (e.g., other users talking in the vicinity, music, traffic, etc.), or even echo from the transmit-side device itself. Thus, the acoustic signals communicated between the devices may sometimes comprise two parts: desired content and the non-desired content (e.g., noise, distortion, etc.). Therefore, when the transmit-side device (e.g., electronic device 110) transfers the acoustic signals, the corresponding electric signals may also comprise two parts (i.e., include the non-desired content).

Therefore, various audio related functions may be used to improve quality (voice and/or other audio). For example, noise cancelation measures may be utilized to enhance the quality of audio in communication systems. The transmit-side device (e.g., the electronic device 110) may be configured, for example, to attempt to eliminate non-desired content (e.g., noise), to ensure that only desired content is transferred to the receive-side. In this regard, the transmit-side device (e.g., the electronic device 110) may be configured to perform various manipulations aimed at reducing or mitigating noise, in order to overcome the impairments due to noisy environment. This may include, for example, use of multiple microphones to improve, the signal-to-noise ratio (SNR), application of noise related functions (algorithms), and the like. Commonly utilized noise related functions (algorithms) may be configured for noise reduction, noise suppression, and/or echo canceling, which when used (e.g., in combination with use of one or more input streams and application of suitable signal processing techniques) may result in higher quality signals. In some instances, the receive-side device (e.g., the electronic device 120) may also be configured to apply audio related functions aimed at attempting to improve audio quality. For example, the receive-side device may be configured to apply a set of noise related functions (algorithms), to eliminate the non-desired content. In some instances, the audio related functions may only be partially performed at the transmit-side. For example, in some implementations, speech recognition may be used to enhance quality of audio. In this regard, in some instances, the speech recognition may only be partially done in the transmit-side (and partially done in the receive-side and/or the network—e.g., in the "cloud"). Nonetheless, in some instances these functions (the transmit-side and/or the receive-side) may generate or otherwise cause some distortion in the desired content.

Use of transmit-side audio quality improvement related functions (e.g., noise-reduction functions) in this manner, however, may not account for experience at the receive-side. For example, transmit-side noise-reduction functions may not be applied (or if applied, not account for) the particular noise experienced at the receive-side. Accordingly, in various implementations of the present disclosure, audio quality related functions, including, e.g., noise related functions (or algorithms used therefor), distortion related functions, and/or other audio quality enhancement related functions, implemented on the transmit-side may be operated, controlled, and/or adjusted using feedback from the receive-side and/or from networking elements (i.e., elements or resources within the network used in communication of the audio content), to improve quality of audio transmitted with the communication system.

The feedback may comprise commands or instructions to the transmit-side to perform audio quality related operations (e.g., noise related operations), and/or control parameters related to (controlling or adjusting) these audio quality related operations. Examples of audio quality related operations that may be performed, controlled, or adjusted in this manner may comprise activating or de-activating the noise reduction algorithms, activating or de-activating microphone(s) (which may be used in obtaining ambient noise related information), performing beam forming to a certain direction (to mitigate effects of noise), apply specific filters or change filter coefficients, change transmit power, change voice encoder (vocoder) parameters or type, and the like. The feedback may also control or adjust functions partially performed at the transmit-side (e.g., speech recognition). The feedback may be communicated via dedicated control channels 150, which may be setup (e.g., through the network 130), to the transmit-side device (e.g., the electronic device 110), from the element providing the feedback, such as the receive-side device (e.g., the electronic device 120). Nonetheless, the use of dedicated control channels is not required, and communicating the feedback to the transmitting device can be done by any suitable means without setting up or using dedicated control channels. For example, in some implementations, feedback may be multiplexed onto other channels and/or connections that may be used (for non-feedback related purposes) by the devices or systems providing the feedback to communicate with the transmitting devices on the audio channel. Thus, with reference to the setup shown in FIG. 1, the electronic device 120 may multiplex the feedback on audio channels normally used thereby to send audio content to the electronic device 110 (i.e., when the two devices are engaged in bidirectional communication of audio).

In some instances, the feedback (e.g., command(s) and/or control parameters) may be sent via an application 160 which may run on the transmit-side and receive-side, which may be configured particularly to enable exchange of audio quality related parameters and commands between the two devices. In some instances, the transmit-side device (i.e., the electronic device 110) may be configured to request an approval from the user 112 before utilizing the feedback—i.e., before making the requested modifications. The approval may be configured to be per request, or global—i.e., accept all requests.

In some example implementations, audio quality related feedback may be based on user input (e.g., provided at the receive-side), with the user input instructing, for example, the transmit-side to perform (and/or adjust) the audio quality (e.g., noise) related operations. For example, in the communication system 100 of FIG. 1, in instances where the audio content is communicated from the electronic device 110 (i.e., the transmit-side device) to the electronic device 120 (i.e., the receive-side device), the user 122 may use the electronic device 120 to listen to the audio sent by the electronic device 110, and when the user 122 decides that the audio heard through the electronic device 120 is too noisy, the user 122 may instruct the electronic device 120 to send noise related command(s) or parameters to the electronic device 110.

In one example implementation, the user 122 may instruct the electronic device 120 to send command(s) to the electronic device 110 to active or de-activate noise related algorithm(s). In this regard, the user 122 may instruct the electronic device 120 (when the user 122 decides that the audio is too noisy) to send a command to the electronic device 110 to activate noise cancelation algorithm(s). When the user 122 decides that that the audio heard through the electronic device 120 is too distorted, the user 122 may instruct the electronic device 120 to send a command to the electronic device 110 to de-activate the noise cancelation algorithm(s). In some instances, the user 122 may instruct the electronic device 120 to send a command to the electronic device 110 to active or de-activate particular noise related algorithm(s) based on characteristics of the noise. For example, the user 122 may hear a background noise of a wind when the user 112 speaks. The user 122 may then instruct the electronic device 120 to send a command to the electronic device 110 to activate a wind noise removal algorithm. If the user 122 does not hear clearly what the user 112 speaks, the user 122 may instruct the electronic device 120 to send a command to the electronic device 110 to de-activate the wind noise removal algorithm. Similarly, when the user 122 hears an echo when the user 112 is speaking, the user 122 may instruct the electronic device 120 to send a command to the electronic device 110 to activate an echo cancellation algorithm.

In another example implementation, the user 122 may instruct the electronic device 120 to send command(s) adjusting use of microphones in the electronic device 110, in a manner that may enhance the quality of received audio. For example, the user 122 may instruct the electronic device 120 to send a command to the electronic device 110 to switch between the microphones (if any) it uses. This may be applicable, for example during a video call, when the user 122 may see the location of the user 112. Alternatively, the user 122 may instruct the electronic device 120 to send a command to the electronic device 110 to mute completely its microphones. This may be applicable, for example, during a conference call when the user 112 does not speak.

In another example implementation, the user 122 may instruct the electronic device 120 to send command(s) adjusting or controlling audio processing used in the transmit-side. For example, the user 122 may instruct the electronic device 120 to send a command to the electronic device 110 to change the audio compression type—e.g., where different compression types may be used for different types of audio.

In some example implementations, noise related feedback may be based on analysis of the received audio in the receive-side device (e.g., the electronic device 120), to determine whether to instruct the transmit-side device (e.g., the electronic device 110) to perform (and/or adjust) the noise related operations. This analysis (and the instructions determined based thereon) may be done autonomously in the receive-side device—i.e., independent of user input or interaction. Alternatively, a user of the receive-side device (i.e., the user 122) may instruct the receive-side device to enhance noisy audio heard through it, by activating (or adjusting) its noise-related functions, and by instructing (without user 122 direct approval or input) the transmit-side device to perform (or adjust) noise related operations—e.g., sending an instruction to apply noise algorithms or parameters related thereto, without direct approval of the user 122. Nonetheless, the transmit-side device (e.g., the electronic device 110) may still require user input (e.g., be required to get an approval from its user—e.g., the user 112).

In one example implementation, the receive-side device (i.e., the electronic device 120) may measure the audio quality, in order to determine corresponding noise instructions to the transmit-side device. The measurements may be done in different ways. For example, in some instances, simple measurements may be utilized—e.g., noise level estimation, SNR estimation, and/or clipping detection. In other instances, more complex measurements, including those done in accordance with particular protocol (or standard) based applications, may be used. For example, the electronic device 120 may be configured to incorporate audio measurements based on ITU-T Recommendation P.563 (which defines single-ended method for objective speech quality assessment in narrow-band telephony applications). The electronic device 120 may analyze the measurement results, and accordingly instruct the transmit-side device (the electronic device 110) regarding noise related operations on the transmit-side—e.g., activate or de-activate particular noise algorithms, activate or de-activate particular microphone(s), perform beam forming to a certain direction, apply specific filters or change filter coefficients, change transmitted power, change voice encoder (vocoder) parameters or type, and the like. In some instances, the feedback instructions may be adaptively configured based on the measurements.

In another example implementation, the electronic device 120 may instructs the electronic device 110 to activate or de-activate the noise reduction algorithms or modify the vocoder, based on the network parameters, which electronic device 120 may measure or estimate. Examples for such network parameters are network delay, Frame Error Rate (FER) or Bit Error Rate (BER).

In another example implementation, the electronic device 120 may calculate parameters and send them to the electronic device 110. The electronic device 110 may then use these parameters as additional information to configure its noise related functions (e.g., noise reduction algorithms or vocoder). Examples for such parameters may be SNR, noise level, audio quality, clipping level, and the like.

In some example implementations, the receive-side may correspond to an application that may be configured to run in the communication system 100 (e.g., in a suitable network node), for use in receiving the audio transmitted from a device (e.g., the electronic device 110), process it and perform actions accordingly. An example for such application is speech recognition which may receive a verbal command from user 112 and execute accordingly. Another example is an application may receive audio content, to identify the content or information related thereto (e.g., song name). Such application may be configured to provide noise feedback instruction to the transmit-side (the electronic device 110), as described above. Such application may also be configured for measuring audio quality, as well as network parameters, such as to adaptively configure the noise feedback instructions. Where the application is speech recognition, if the application fails to recognize a verbal command by user 112, the application may request that the transmit-side device (the electronic device 110) activate or de-activate some of the noise reduction algorithms, based on the failure of the algorithm.

Figure 2:
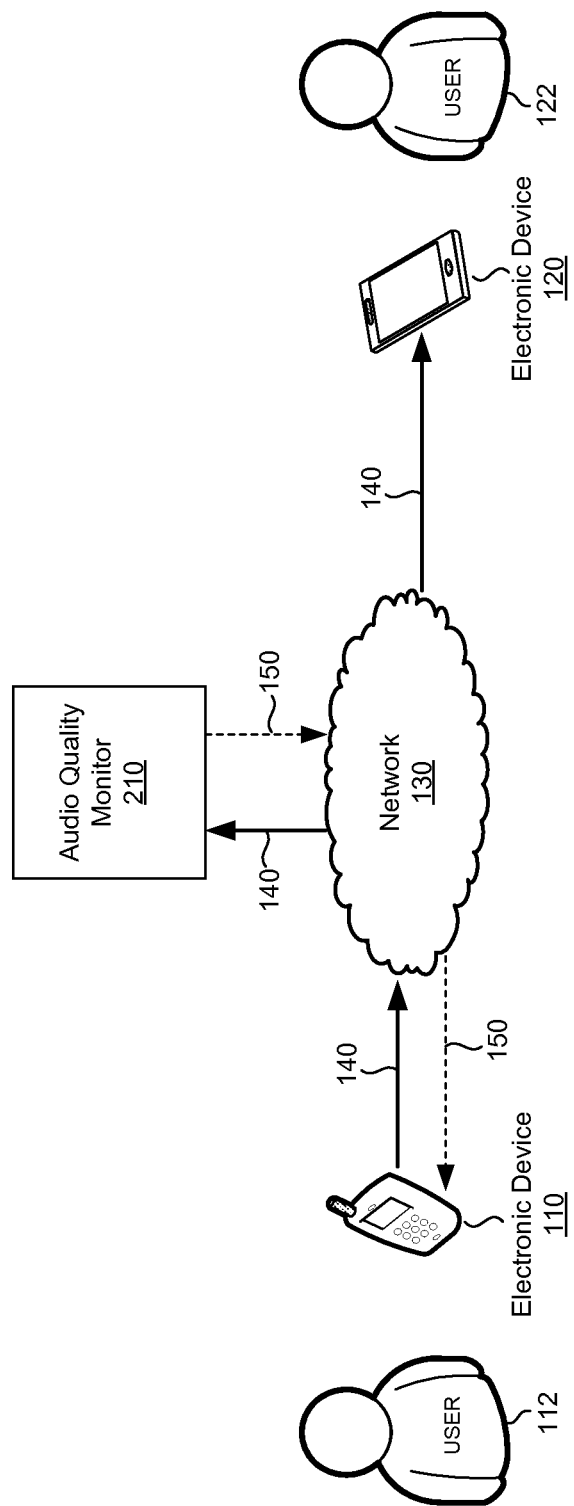
FIG. 2 illustrates an example communication system that may support network-based non-intrusive quality measurements, for use in improving quality of voice and/or other audio.

FIG. 2 illustrates an example communication system that may support network-based non-intrusive quality measurements, for use in improving quality of voice and/or other audio. Referring to FIG. 2, there is shown a communication system 200, comprising the electronic devices 110 and 120, and the network 130, of FIG. 1. The system 200 may also comprise a network-based audio quality monitor 210.

The audio quality monitor 210 may comprise suitable circuitry for processing audio content exchanged via the network 130, such as to enable measuring quality of audio content and/or providing to transmitting devices feedback based on the quality measurements. The quality measurements related feedback may then be used in transmitting devices in performing (or enhancing) audio related functions (e.g., noise and/or distortion related functions). The audio quality monitor 210 may be implemented in a dedicated, network node within the network 130. Alternatively (or additionally), at least some of the functions described herein with respect to the audio quality monitor 210 may be implemented adaptively in available resources (hardware and/or software) in the network 130—i.e., in 'cloud' like manner.

In operations, the communication system 200 may be utilized to support exchange of audio between electronic devices (e.g., the electronic devices 110 and 120), and to provide audio quality (e.g., noise, distortion, and the like) feedback to the transmit-side (devices), for controlling or adjusting audio quality (e.g., noise, distortion, and the like) related functions therein, substantially as described with respect to FIG. 1. However, in the communication system 200, network elements or resources (e.g., hardware and/or software resources), such as the audio quality monitor 210, may be used in providing the audio quality related feedback (and performing the analysis needed therefor) rather than the receive-side (device). For example, the audio quality monitor 210 may receive (a copy of) the signals 140 corresponding to the transmitted audio, process them, and control audio and voice quality accordingly. For example, the audio quality monitor 210 may provide audio quality related feedback as described with respect to FIG. 1, instructing the transmit-side device (e.g., the electronic device 110) to perform (or adjust) audio quality related operations—e.g., activate or de-activate the noise reduction algorithms, activate or de-activate one or more microphone, activate or de-activate noise reduction algorithms, perform beam forming to a certain direction, apply specific filters or change filter coefficients, change transmitted power, change vocoder parameters or type, and the like. Also, as described with respect to FIG. 1, the audio quality monitor 210 may measure the audio quality and/or network parameters, and may utilize the measurement in adaptively formulating the noise feedback instructions to the transmit-side device regarding noise related functions—e.g., deciding which algorithms to activate and which to de-activate on the transmit device 110. Again, the measurements may be simple (e.g., noise level estimation, SNR estimation, clipping detection, etc.) or more complex (e.g., based on ITU-T Recommendation P.563).

Figure 3:
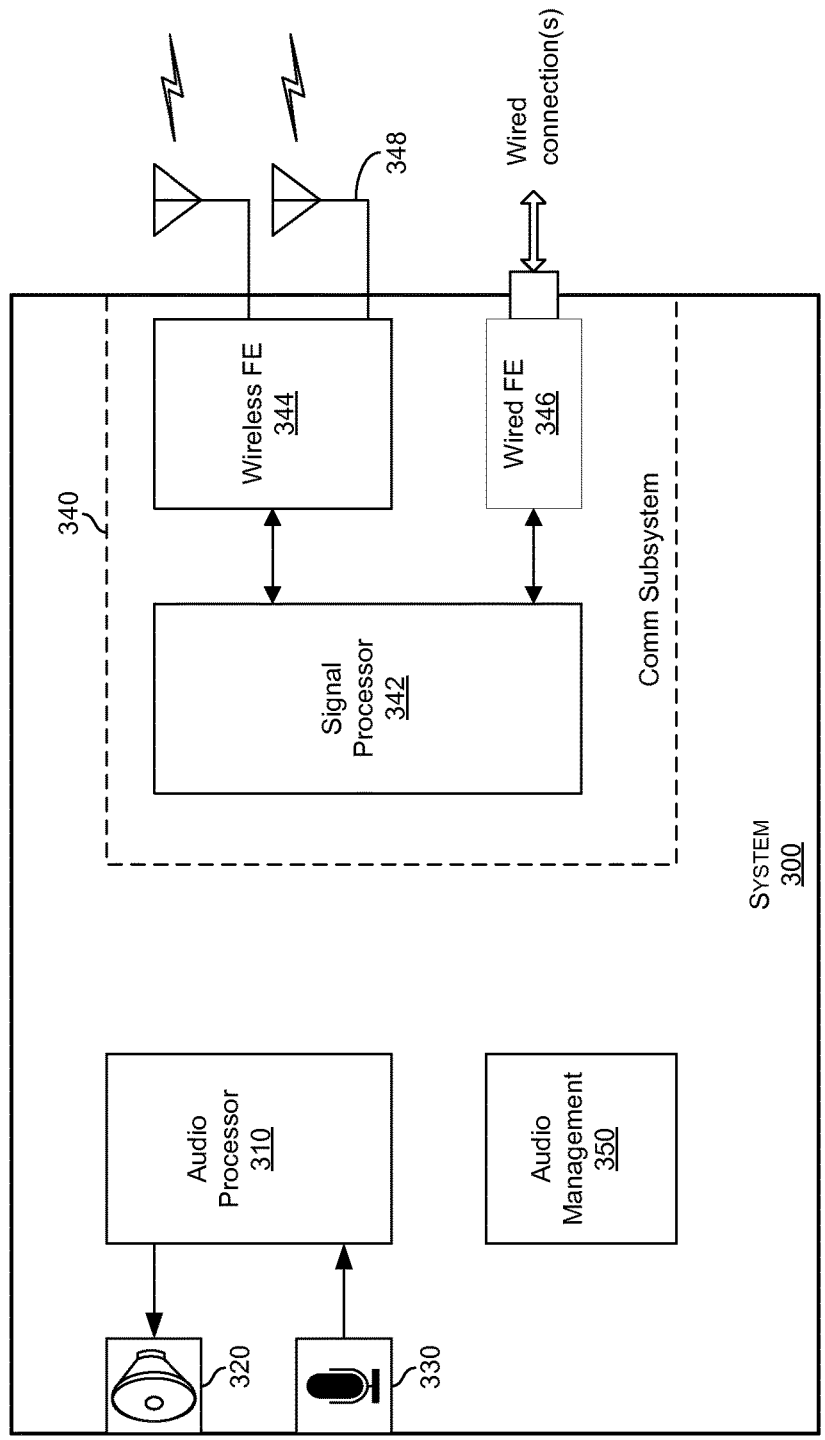
FIG. 3 illustrates an example system that may support improving quality of voice and/or other audio based on non-intrusive quality measurements.

FIG. 3 illustrates an example system that may support improving quality of voice and/or other audio based on non-intrusive quality measurements. Referring to FIG. 3, there is shown a system 300.

The system 300 may comprise suitable circuitry for implementing various aspects of the disclosure. The system 300 may correspond to one or both of the electronic devices 110 and 120 of FIG. 1, and/or the audio quality monitor 210 of FIG. 2. The system 300 may comprise, for example, one or more audio processors 310, one or more audio output devices (e.g., speakers) 320, one or more audio input devices (e.g., microphones) 330, a communication subsystem 340, and an audio management block 350.

The audio processor 310 may comprise suitable circuitry for perform various audio signal processing functions in the system 300. The audio processor 310 may be operable, for example, to process audio signals captured via input audio components (e.g., the microphone 330), to enable converting it to electrical signals—e.g., for storage and/or communication external to the system 300. The audio processor 310 may also be operable to process electrical signals to generate corresponding audio signals for output via output audio components (e.g., the speaker 320). The audio processor 310 may also comprise suitable circuitry configurable to perform additional, audio related functions—e.g., voice coding/decoding operations. In this regard, the audio processor 310 may be comprise analog-to-digital converters (ADCs), one or more digital microphone connections (PDMs), one or more digital-to-analog converters (DACs), one or more digital output connections (PDMs and/or PWMs), one or more digital interface for input/output audio (e.g., $I^2S$, TDM, SLIMbus, etc.), and/or one or more multiplexers (MUXs), which may be used in directing signals handled in the audio processor 310 to appropriate input and output ports thereof. The audio processor 310 may comprise a general purpose processor, which may be configured to perform or support particular types of operations (e.g., audio related operations). Alternatively, the audio processor 310 may comprise a special purpose processor—e.g., a digital signal processor (DSP), a baseband processor, and/or an application processor (e.g., ASIC).

In some instances, the audio processor 310 may receive its audio signals captured via input audio components indirectly. For example, system 300 may be a cellular phone that receives its audio from an external Bluetooth headset that has a microphone.

The communication subsystem 340 may comprise suitable circuitry for supporting communication of data to and/or from the system 300. For example, the communication subsystem 340 may comprise a signal processor 342, a wireless front-end 344, a wired front-end 346, and one or more antennas 348. The signal processor 342 may comprise suitable circuitry for processing signals transmitted and/or received by the system 300, in accordance with one or more wired or wireless protocols supported by the system 300. The signal processor 342 may be operable to perform such signal processing operation as filtering, amplification, up-conversion/down-conversion of baseband signals, analog-to-digital conversion and/or digital-to-analog conversion, encoding/decoding, encryption/decryption, and/or modulation/demodulation. The wireless FE 344 may comprise circuitry for performing wireless transmission and/or reception (e.g., via the antenna(s) 348), such as over a plurality of supported RF bands. The antenna(s) 348 may comprise suitable circuitry for facilitating over-the-air transmission and/or reception of wireless signals within certain bandwidths and/or in accordance with one or more wireless interfaces supported by the system 300. The wired FE 346 may comprise suitable circuitry for performing wired based transmission and/or reception, such as over a plurality of supported physical wired media. The wired FE 346 may support communications of RF signals via the plurality of wired connectors, within certain bandwidths and/or in accordance with one or more wired protocols (e.g. Ethernet) supported by the system 300.

The audio management block 350 may comprise suitable circuitry for supporting audio related functions in the system 300, particularly with respect to audio content handled therein. For example, the audio management block 350 may support performing audio enhancement related functions, such as noise reduction, noise suppression, echo cancellation, distortion reduction, and the like. The audio management block 350 may also support additional audio quality related operations, such as analysis of audio (e.g., to determine or estimate audio quality measurements). In some instances, the audio management block 350 may support audio quality feedback related operations.

In operation, the system 300 may be utilized in supporting communication of audio (e.g., voice and/or other audio). Further, the electronic device may support use of noise related functions in conjunction with the communication of audio, with support for receive-side and/or network based noise control feedback. For example, the communication subsystem 340 may be utilized in setting up and/or utilizing connections that may be used in communication of audio content (e.g., the connections 140), and/or connection for use in communication of noise control feedback (e.g., the connection 150). These connections may be established using wired and/or wireless links (via the wired FE 346 and/or the wireless FE 344, respectively).

The audio related components of the system 300 may be used in conjunction with handling of communicated audio content. For example, when the system 300 is functioning as a transmit-side device, audio signals may be captured via the microphone 330, processed in the audio processor 310—e.g., converting them into digital data, which may then be processed via the signal processor 342, then transmitted via the wired FE 346 and/or the wireless FE 344. When the system 300 is functioning as receive-side device, signals carrying audio content may be received via the wired FE 346 and/or the wireless FE 344, then processed via the signal processor 342, to extract the data corresponding to the audio content, which (the data) may then be processed via the audio processor 310 to convert them to audio signals that may be outputted via the speaker 320.

In some instances, it may be necessary to perform audio quality enhancement related functions (e.g., noise reduction, noise suppression, echo cancellation, distortion reduction, etc.), such as when the audio content handled in the system 300 is noisy. The audio quality enhancement related functions may be performed by the audio management block 350, which may also determine when the audio content is (or is not) noisy. Further, in some instances, the electronic device may be configured to support receive-side and/or network based audio quality control feedback. For example, when the system 300 is functioning as a receive-side device (or as network element—e.g., the audio quality monitor 210), audio quality control feedback (e.g., commands and/or control parameters) may be determined, such as by audio management block 350. In this regard, the audio quality control feedback may be determined, by the audio management block 350, based on user input, preconfigured instructions (e.g., an application), audio quality measurement, network related measurements/parameters, and the like. The audio quality control feedback may then be communicated (via the communication subsystem 310) to the transmit-side device. When the system 300 is functioning as transmit-side device, audio quality control feedback may be received (via the communication subsystem 310), such as from receive-side device or a network element (e.g., the audio quality monitor 210). The audio quality control feedback may then be processed—e.g., by the audio management block 350, and utilized to control (e.g., activating, de-activating, adjusting, etc.) audio quality (e.g., noise, distortion, etc.) related functions in the system 300.

Figure 4:
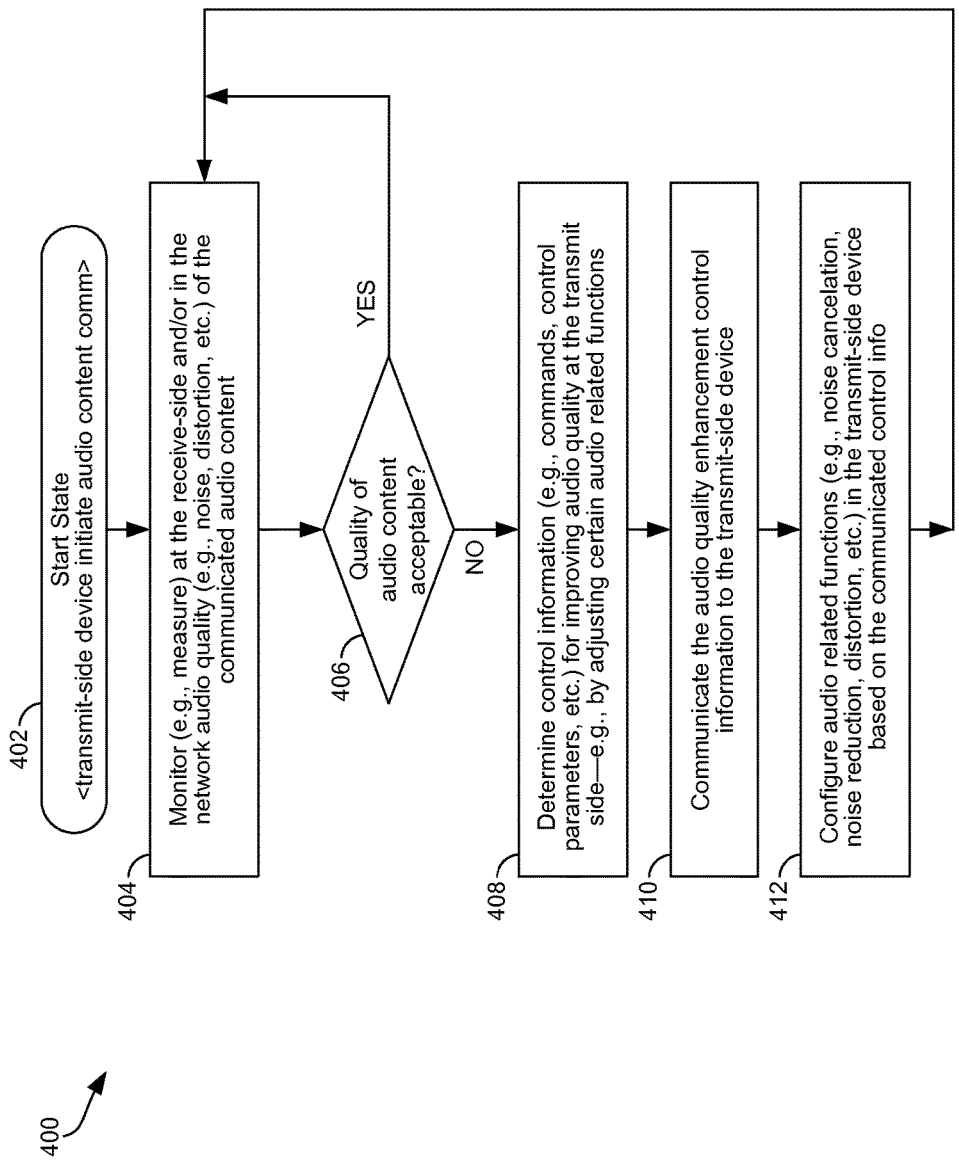
FIG. 4 is a flowchart illustrating an example process for improving quality of voice and/or other audio based on non-intrusive quality measurements.

FIG. 4 is a flowchart illustrating an example process for improving quality of voice and/or other audio based on non-intrusive quality measurements. Referring to FIG. 4, there is shown a flow chart 400, comprising a plurality of example steps, which may be executed in a communication system (e.g., the communication system 100 of FIG. 1 or the communication system 200 of FIG. 2), to facilitate non-intrusive noise processing.

In starting step 402, a transmit-side device (e.g., the electronic device 110) may initiate communication of audio content. The audio content may be communicated over a network (e.g., the network 130).

In step 404, audio quality of the communicated audio content may be monitored (e.g., measured or estimated) at the receive-side (e.g., the electronic device 120) and/or in the network (e.g., the audio quality monitor 210 of the network 130).

In step 406, it may be determined whether audio quality of the audio content is acceptable or not. For example, determining audio quality of audio content (i.e., whether it is acceptable or not) may be based on determining whether the audio content is noisy (e.g., due to ambient noise, echo, or the like) or not. Determining audio quality of audio content (i.e., whether it is acceptable or not) also may be based on distortion level in the audio—i.e., whether the audio is (or not) too distorted. Thus, determining whether audio quality of the audio content is acceptable or not may be based on determining of noise—i.e., whether noise is (or not) too high (which would prompt attempting eliminating the noise), and/or determining whether the distortion level is (not) too high (which may be address—that is the high distortion level—by reduce noise reduction applied at the transmit-side). In some instances, determining whether the audio quality of audio content is acceptable or not (e.g., based on noise and/or distortion) may be based on one or more thresholds—i.e., specifying certain measure of noise and/or distortion that may be tolerated. The thresholds may be set, for example, based on balancing of degree of quality vs. cost (resources, power, delay, etc.) of applying correction measures. In instances where it is determined that the audio quality of audio content is acceptable (i.e., the audio content is not too noisy), the process may loop back to step 404.

Returning to step 406, in instances where the audio content is not acceptable (i.e., the audio content is noisy), the process may proceed to step 408. In step 408, control information for improving audio quality at the transmit-side may be determined. In this regard, audio quality may be improved at the transmit-side by adjusting audio quality related functions, such as noise reduction, noise suppression, echo cancellation, distortion reduction, equalization, and/or audio rate conversion. The determination may be based on user input, analysis of the audio content (e.g., measurement or assessment of voice or audio quality), network parameters, and the like.

In step 410, the audio quality improvement related control information may be communicated to the transmit-side device (e.g., over a dedicated control channel, such as the channel 150).

In step 412, audio related functions (e.g., noise reduction, noise suppression, echo cancellation, distortion reduction, equalization, audio rate conversion, etc.) in the transmit-side device may be configured (performed, adjusted, etc.) based on the communicated control information. The process may then loop back to step 404.

In some example implementations, a method for providing non-intrusive noise cancelation in a communication system may be performed in connection with electronic devices (e.g., electronic devices 110 and 120, or stand-alone audio quality monitor 210), which may be utilized in exchanging audio content via the system (e.g., through the network 130). The method may comprise receiving by a first electronic device (e.g., electronic device 120 or stand-alone audio quality monitor 210) audio content, and determining if the received audio content is noisy. When the audio content is noisy, the method also comprises determining noise related parameters associated with the received audio content, and communicating the noise related parameters to a second electronic device (e.g., electronic device 110), from which the audio content was transmitted. The noise related parameters may control and/or adjust noise related functions in the second electronic device. The noise related functions may comprise noise reduction, noise suppression, and/or echo cancellation. The method may further comprise determining if the received audio content is noisy based on one or more noise related thresholds. The method may further comprise communicating the noise related parameters to the second electronic device over a dedicated control channel setup between the devices. The method may further comprise controlling handling of received noisy audio content based on user input. The user input may control or adjust the determination that the audio content is noisy and/or the determination of noise related parameters. The first electronic device may comprise a communication device (e.g., the electronic device 120), or a network element or resource (e.g., the audio quality monitor 210) in a communication network (e.g., the network 130) that is used in communicating audio content among a plurality of devices. The audio content may be destined for the first electronic device, or for another device. The first electronic device may comprise, when the audio content is destined for another device, the network element or resource in the network used for communicating audio content.

In some example implementations, a system (system 300 of FIG. 3) may comprise one or more circuits (e.g., audio processor 310, communication subsystem 340, and audio management block 350), and may be used to provide audio quality in non-intrusive manner—e.g., in a first electronic device (e.g., electronic device 120 or stand-alone audio quality monitor 210). The one or more circuits may be operable to receive audio content, and determine if the received audio content is noisy or distorted. When the audio content is noisy or distorted, the one or more circuits are operable to determine quality related parameters (including, e.g., distortion and/or noise related parameters) associated with the received audio content, and communicate the quality related parameters to a second electronic device (e.g., electronic device 110), from which the audio content is transmitted. The quality related parameters may control and/or adjust noise related functions in the second electronic device. The noise related functions comprise noise reduction, noise suppression, and/or echo cancellation. The one or more circuits may be operable to determine if the received audio content is noisy based on one or more noise related thresholds. The one or more circuits may be operable to communicate the quality related parameters to the second electronic device over a dedicated control channel setup between the devices. The one or more circuits may be operable to control handling of received noisy audio content based on user input. The user input may control or adjust the determination that the audio content is noisy and/or the determination of noise related parameters. The first electronic device may comprise a communication device (e.g., the electronic device 120), or a network element or resource (e.g., the audio quality monitor 210) in a communication network (e.g., the network 130) that is used in communicating audio content among a plurality of devices. The audio content may be destined for the first electronic device, or for another device. The first electronic device may comprise, when the audio content is destined for another device, the network element or resource in the network used for communicating audio content.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for non-intrusive noise cancelation.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. Accordingly, some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

I claim:

1. A system, comprising:
   one or more circuits for use in a first electronic device that is a communication device and comprises a microphone, the one or more circuits are being operable to:
   receive audio content;
   analyze the received audio content to determine quality related parameters associated with the received audio content; and
   communicate the quality related parameters to a second electronic device, from which the audio content was transmitted, wherein the quality related parameters are used by the second electronic device to control audio related functions in the second electronic device without user intervention; and
   wherein the audio related functions comprise at least one out of compression, equalization, audio rate conversion, and echo cancellation.

2. The system of claim 1, wherein the audio related functions comprise compression.

3. The system of claim 1, wherein the control by the second electronic device of its audio related functions based on the quality related parameters comprises initiating, adjusting, or terminating one or more of the audio related functions.

4. The system of claim 1, wherein the audio related functions comprise echo cancellation.

5. The system of claim 1, wherein the one or more circuits are operable to communicate the quality related parameters to the second electronic device over a dedicated control channel setup between the devices.

6. The system of claim 1, wherein the one or more circuits are operable to control handling of the received audio content based on user input provided by a user and received by the system.

7. The system of claim 6, wherein the user input controls or adjusts at least one out of a determination of an audio quality of the audio content and the determination of the quality related parameters.

8. The system of claim 1, wherein the first electronic device comprises a communication device, or a network element or resource in a communication network that is used in communicating audio content among a plurality of devices.

9. The system of claim 1, wherein the audio related functions comprise audio rate conversion.

10. The system of claim 1, wherein the first electronic device comprises, when the audio content is destined for another device, a network element or resource in a network used for communicating audio content.

11. The system according to claim 1 wherein the one or more circuits being operable to: determine a command in response to the quality related parameters; and send the command to the second electronic device; wherein the command, once executed by the second electronic device causes the second electronic device to perform at least one out of audio quality related operations and control parameters related to the audio quality related operations; wherein the first electronic device is configured to receive audio from a user of the first electronic device and wherein the second electronic device is configured to receive audio from a user of the second electronic device.

12. The system of claim 1, wherein the one or more circuits are operable to receive from the second electronic device, quality parameters related to audio content transmitted from the first electronic device to the second electronic device; and control audio related functions in the first electronic device without user intervention.

13. The system according to claim 1 wherein the audio related functions comprise at least one of noise reduction and noise suppression.

14. The system according to claim 1 wherein the audio related functions comprise equalization.

15. A method, comprising performing, by a first electronic device that comprises a microphone, the steps of:
   receiving audio content;
   analyzing the received audio content to determine quality related parameters associated with the received audio content; and
   communicating the quality related parameters to a second electronic device, from which the audio content was transmitted, wherein the quality related parameters are used by the second electronic device to control audio related functions in the second electronic device without user intervention; and wherein the audio related functions comprise at least one out of compression, equalization, audio rate conversion, and echo cancellation.

16. The method of claim 15, wherein the audio related functions comprise compression.

17. The method of claim 15, wherein the control by the second electronic device of its audio related functions based on the quality related parameters comprises initiating, adjusting, or terminating one or more of the audio related functions.

18. The method of claim 15, wherein the audio related functions comprise echo cancellation.

19. The method of claim 15, comprising communicating the quality related parameters to the second electronic device over a dedicated control channel setup between the devices.

20. The method of claim 15, comprising controlling handling of the received audio content based on user input provided by a user and received by the system.

21. The method of claim 20, wherein the user input controls or adjusts at least one of a determination of an audio quality of the received audio content and the determination of the quality related parameters.

22. The method of claim 15, wherein the first electronic device comprises a communication device, or a network element or resource in a communication network that is used in communicating audio content among a plurality of devices.

23. The method of claim 15, wherein the audio related functions comprise audio rate conversion.

24. The method of claim 15, wherein the first electronic device comprises, when the audio content is destined for another device, a network element or resource in a network used for communicating audio content.

25. The method according to claim 15 comprising determining a command in response to the quality related parameters; and sending the command to the second electronic device; wherein the command, once executed by the second electronic device causes the second electronic device to perform at least one out of audio quality related operations and control parameters related to the audio quality related operations; wherein the first electronic device is configured to receive audio from a user of the first electronic device and wherein the second electronic device is configured to receive audio from a user of the second electronic device.

26. The method according to claim 25 wherein the audio related functions comprise at least one out of compression, speech recognition and echo cancellation.

27. The method according to claim 15 comprising: receiving, by the first electronic device and from the second electronic device, quality parameters related to audio content transmitted from the first electronic device to the second electronic device; and controlling, by the first electronic device, audio related functions in the first electronic device without user intervention.

28. The method according to claim 15 wherein the audio related functions comprise equalization.

29. The method according to claim 15 wherein the audio related functions comprise at least one of noise reduction and noise suppression.

30. A system, comprising: one or more circuits for use in a first electronic device that is a communication device and comprises a microphone, the one or more circuits are being operable to: receive audio content; analyze the received audio content to determine quality related parameters associated with the received audio content; and communicate the quality related parameters to a second electronic device, from which the audio content was transmitted, wherein the quality related parameters are used by the second electronic device to control audio related functions in the second electronic device without user intervention; determine a command in response to the quality related parameters; and send the command to the second electronic device; wherein the command, once executed by the second electronic device causes the second electronic device to perform at least one out of audio quality related operations and control parameters related to the audio quality related operations; wherein the first electronic device is configured to receive audio from a user of the first electronic device and wherein the second electronic device is configured to receive audio from a user of the second electronic device;

wherein the audio quality related operations comprise activating or de-activating noise reduction algorithms applied by the second electronic device.

31. A system, comprising: one or more circuits for use in a first electronic device that is a communication device and comprises a microphone, the one or more circuits are being operable to: receive audio content; analyze the received audio content to determine quality related parameters associated with the received audio content; and communicate the quality related parameters to a second electronic device, from which the audio content was transmitted, wherein the quality related parameters are used by the second electronic device to control audio related functions in the second electronic device without user intervention; determine a command in response to the quality related parameters; and send the command to the second electronic device; wherein the command, once executed by the second electronic device causes the second electronic device to perform at least one out of audio quality related operations and control parameters related to the audio quality related operations; wherein the first electronic device is configured to receive audio from a user of the first electronic device and wherein the second electronic device is configured to receive audio from a user of the second electronic device;

wherein the audio quality related operations comprise activating or de-activating one or more microphones of the second electronic device.

32. A system, comprising: one or more circuits for use in a first electronic device that is a communication device and comprises a microphone, the one or more circuits are being operable to: receive audio content; analyze the received audio content to determine quality related parameters associated with the received audio content; and communicate the quality related parameters to a second electronic device, from which the audio content was transmitted, wherein the quality related parameters are used by the second electronic device to control audio related functions in the second electronic device without user intervention; determine a command in response to the quality related parameters; and send the command to the second electronic device; wherein the command, once executed by the second electronic device causes the second electronic device to perform at least one out of audio quality related operations and control parameters related to the audio quality related operations; wherein the first electronic device is configured to receive audio from a user of the first electronic device and wherein the second electronic device is configured to receive audio from a user of the second electronic device;

wherein the audio quality related operations comprise performing, by the second electronic device, beam forming to a certain direction.

33. A system, comprising: one or more circuits for use in a first electronic device that is a communication device and comprises a microphone, the one or more circuits are being operable to: receive audio content; analyze the received audio content to determine quality related parameters associated with the received audio content; and communicate the quality related parameters to a second electronic device, from which the audio content was transmitted, wherein the quality related parameters are used by the second electronic device to control audio related functions in the second electronic device without user intervention;

wherein the one or more circuits being operable to detect a failure of a speech recognition applied by the first electronic device and in response to failure requesting the second electronic device to activate or deactivate a noise reduction algorithm applied by the second electronic device.

34. A method, comprising performing, by a first electronic device that comprises a microphone, the steps of: receiving audio content; analyzing the received audio content to determine quality related parameters associated with the received audio content; and communicating the quality related parameters to a second electronic device, from which the audio content was transmitted, wherein the quality related parameters are used by the second electronic device to control audio related functions in the second electronic device without user intervention;

determining a command in response to the quality related parameters; and sending the command to the second electronic device; wherein the command, once executed by the second electronic device causes the second electronic device to perform at least one out of audio quality related operations and control parameters related to the audio quality related operations; wherein the first electronic device is configured to receive audio from a user of the first electronic device and wherein the second electronic device is configured to receive audio from a user of the second electronic device;

wherein the audio quality related operations comprise activating or de-activating one or more microphones of the second electronic device.

35. A method, comprising performing, by a first electronic device that comprises a microphone, the steps of: receiving audio content; analyzing the received audio content to determine quality related parameters associated with the received audio content; and communicating the quality related parameters to a second electronic device, from which the audio content was transmitted, wherein the quality related parameters are used by the second electronic device to control audio related functions in the second electronic device without user intervention;

determining a command in response to the quality related parameters; and sending the command to the second electronic device; wherein the command, once executed by the second electronic device causes the second electronic device to perform at least one out of audio quality related operations and control parameters related to the audio quality related operations; wherein the first electronic device is configured to receive audio from a user of the first electronic device and wherein the second electronic device is configured to receive audio from a user of the second electronic device;

wherein the audio quality related operations comprise performing, by the second electronic device, beam forming to a certain direction.

* * * * *